US008411783B2

(12) United States Patent
Doron et al.

(10) Patent No.: US 8,411,783 B2
(45) Date of Patent: Apr. 2, 2013

(54) METHOD OF IDENTIFYING A PRECODING MATRIX CORRESPONDING TO A WIRELESS NETWORK CHANNEL AND METHOD OF APPROXIMATING A CAPACITY OF A WIRELESS NETWORK CHANNEL IN A WIRELESS NETWORK

(75) Inventors: Ayelet Doron, Modi'in (IL); Rotem Avivi, Petah-Tiqwa (IL); Yuval Lomnitz, Herzelia (IL)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 12/586,620

(22) Filed: Sep. 23, 2009

(65) Prior Publication Data

US 2011/0069773 A1 Mar. 24, 2011

(51) Int. Cl.
*H04L 1/02* (2006.01)
(52) U.S. Cl. ........................................................ 375/267
(58) Field of Classification Search .................. 375/267, 375/260, 341, 346, 347; 455/278.1, 272, 455/269
See application file for complete search history.

(56) References Cited

U.S. PATENT DOCUMENTS

| 7,937,057 | B2 * | 5/2011 | Kishigami et al. ......... 455/278.1 |
| 2007/0127586 | A1 | 6/2007 | Hafeez | |
| 2007/0160162 | A1 | 7/2007 | Kim et al. | |
| 2007/0165738 | A1 | 7/2007 | Barriac et al. | |
| 2008/0181335 | A1 | 7/2008 | Ponnampalam et al. | |
| 2008/0260054 | A1 | 10/2008 | Myung et al. | |
| 2009/0190685 | A1 | 7/2009 | Kimura | |

FOREIGN PATENT DOCUMENTS

| WO | 2011/037738 A2 | 3/2011 |
| WO | 2011037738 A3 | 3/2011 |

OTHER PUBLICATIONS

Love, David J., et al., "Limited Feedback Unitary Precoding for Spatial Multiplexing Systems", IEEE Transactions on Information Theory, vol. 51, No. 8, Aug. 2005, pp. 2967-2976.
International Search Report and Written Opinion received for PCT Application No. PCT/US2010/047699, Mailed on May 26, 2011, 11 pages.
International Preliminary Report on Patentability for PCT Patent Application No. PCT/US2010/047699, mailed on Apr. 5, 2012, 8 pages.

* cited by examiner

*Primary Examiner* — Khai Tran
(74) *Attorney, Agent, or Firm* — Kenneth A. Nelson

(57) ABSTRACT

A method of identifying a precoding matrix corresponding to a wireless network channel comprises the steps of identifying a capacity metric that includes an identity matrix, approximating the capacity metric using an approximation metric that ignores the identity matrix, using the approximation metric to search over all matrices in a matrix codebook in order to identify a particular precoding matrix that increases a capacity of the wireless network channel, and transmitting across the wireless network channel a matrix index that corresponds to the particular precoding matrix. Additional techniques for identifying precoding matrices are also described herein, as is a method of approximating a capacity of a wireless network channel in a wireless network.

8 Claims, 9 Drawing Sheets

METHOD OF IDENTIFYING A PRECODING MATRIX CORRESPONDING TO A WIRELESS NETWORK CHANNEL AND METHOD OF APPROXIMATING A CAPACITY OF A WIRELESS NETWORK CHANNEL IN A WIRELESS NETWORK

FIELD OF THE INVENTION

The disclosed embodiments of the invention relate generally to wireless network communications, and relate more particularly to beamforming methods and to methods for determining channel state information.

BACKGROUND OF THE INVENTION

Closed-loop (CL) multiple-input-multiple-output (MIMO) is a technique for enhancing the performance of a link (also referred to as a channel) between a transmitting antenna (such as an antenna located at a base station) and a receiving antenna (such as an antenna located at a mobile station) by providing the transmitter with knowledge about the channel state. The transmitter may have full or partial information about a matrix of channel coefficients, and the transmitter can use that information to increase the capacity and improve the performance of the link. Closed-loop MIMO operation will be a feature of the IEEE 802.16 wireless broadband standard (popularly known as Worldwide Interoperability for Microwave Access, or WiMAX), and specifically of 802.16e Rev2 (also known as Ver1.5) and of 802.16m. Closed loop MIMO is a generalization of beamforming for the case of more than one transmitted stream (i.e., an output from a MIMO encoder). In certain embodiments, beamforming includes the use of signal processing techniques such as "precoding" matrices that weight the various transmitted signal streams in order to improve system performance.

BRIEF DESCRIPTION OF THE DRAWINGS

The disclosed embodiments will be better understood from a reading of the following detailed description, taken in conjunction with the accompanying figures in the drawings in which.

Figure 1:
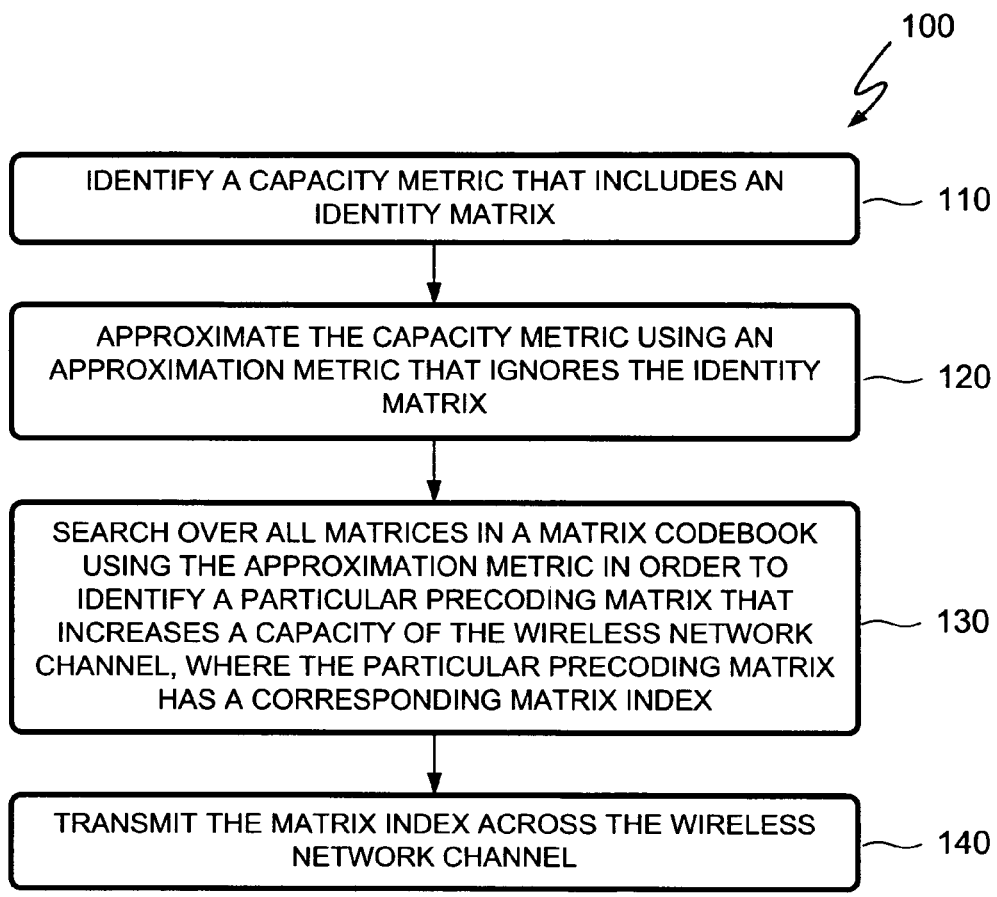
FIG. 1 is a flowchart illustrating a method of identifying a precoding matrix corresponding to a wireless network channel according to an embodiment of the invention.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements, while similar reference numerals may, but do not necessarily, denote similar elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method. Furthermore, the terms "comprise," "include," "have," and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "in one embodiment" herein do not necessarily all refer to the same embodiment.

DETAILED DESCRIPTION OF THE DRAWINGS

In one embodiment of the invention, a method of identifying a precoding matrix corresponding to a wireless network channel comprises the steps of identifying a capacity metric that includes an identity matrix, approximating the capacity metric using an approximation metric that ignores the identity matrix, using the approximation metric to search over all matrices in a matrix codebook in order to identify a particular precoding matrix that increases a capacity of the wireless network channel, and transmitting across the wireless network channel a matrix index that corresponds to the particular precoding matrix. In another embodiment, the method comprises constructing a diagonal matrix that includes a decoder error energy term from a minimum mean square error decoder, calculating a capacity of a link with the minimum mean square error decoder in order to construct a minimum mean square error metric, searching over all matrices in a matrix codebook using the minimum mean square error metric in order to identify a particular precoding matrix that increases a capacity of the wireless network channel, and transmitting across the wireless network channel a matrix index corresponding to the particular precoding matrix.

In a particular embodiment of the invention, a method of selecting a target precoding matrix for M sub-carriers (i.e., a logical band) from a matrix codebook stored in a memory device and containing a plurality of precoding matrices comprises identifying a selection criterion, selecting a metric corresponding to the selection criterion, and averaging a channel matrix of every N sub-carriers, where N is greater than 1 and less than or equal to M, in order to create L averaged channel matrices. Then, for each precoding matrix in the matrix codebook, calculating the metric using each one of the averaged channel matrices in order to obtain L averaged metrics and calculating a sum/average of the L averaged metrics over the M sub-carriers. Then, the method comprises selecting as the target precoding matrix a particular one of the plurality of precoding matrices that increases the sum/average of the metric.

In a certain embodiment, a method of selecting, for multiple channel instances, a target precoding matrix from a matrix codebook stored in a memory device and containing a plurality of precoding matrices comprises providing a buffer of Ncodewords metrics according to a size of the matrix codebook. Then, for each precoding matrix in the matrix codebook, calculating a metric of the precoding matrix for each channel instance, and accumulating the metrics of each precoding matrix to the metric in the buffer. Then, the method comprises selecting as the target precoding matrix a particular one of the plurality of precoding matrices that yields a desired accumulated metric.

In one embodiment of the invention, a method of approximating a capacity of a wireless network channel in a wireless network comprises receiving a plurality of pilot tones, estimating a plurality of channel response matrices and a plurality of noise power terms such that there exists a channel response matrix and a noise power term for each one of the plurality of pilot tones, performing a trace operation and a determinant operation on each one of the plurality of channel response matrices (or on a function of these matrices, e.g., $H \cdot H^H$ where $(\ )^H$ is the Hermitian transpose operator) in order to obtain a plurality of traces and a plurality of determinants, finding an average value of the plurality of traces, an average value of the absolute value of the plurality of determinants, and an average value of the plurality of noise power terms, representing the capacity of the wireless network channel as a function of the average value of the plurality of traces, the average value of the absolute value of the plurality of determinants, and the average value of the plurality of noise power terms, and finding a solution of the function.

The channel model used throughout this document (unless otherwise noted) is as follows:

$$\bar{x} = F\bar{s} \quad (1)$$

where $\bar{x}$ is the transmitted signal (with vector size $N_{tx} \times 1$), $N_{tx}$ is the number of actual (physical) transmitting antennas, F is the precoding matrix (with matrix size $N_{tx} \times N_{streams}$), $N_{streams}$ is the number of transmitted streams, i.e., the number of outputs from the MIMO encoder), and $\bar{s}$ is the output from the MIMO encoder, and $$\bar{y} = HF\bar{s} + \bar{v} \quad (2)$$

where $\bar{y}$ is the received signal (with vector size $N_{rx} \times 1$), $N_{rx}$ is the number of receiving antennas, H is the channel matrix (with matrix size $N_{rx} \times N_{tx}$), and $\bar{v}$ is the channel noise (with vector size $N_{rx} \times 1$). The relationships between $N_{streams}$, $N_{tx}$, and $N_{rx}$ should satisfy $N_{streams} \leq \min(N_{tx}, N_{rx})$. In at least one embodiment, $N_{rx} \geq 2$, i.e., there exist multiple receive antennas.

We consider the CL-MIMO for the IEEE 802.16e standard and WiMAX version 1.5 (including TDD and H-FDD) and also for the IEEE 802.16m standard. The method selected for CL-MIMO is codebook-based precoding, where the precoding matrix is selected from a codebook, that is, a known set of matrices. The receiver selects the index of the most suitable matrix from the codebook according to the channel state and sends it to the transmitter. Then, the transmitter uses the corresponding matrix as the precoding matrix. The precoding matrices used in 802.16e and 802.16m are unitary—the sum power of each matrix column equals one. This means there is no power loading (water pouring) between the transmitted streams. We assume: MIMO vertical encoding; spatial multiplexing; MIMO decoder is minimum mean square error (MMSE) or maximum likelihood decoding (MLD); and the permutation is for continuous/adjacent subcarrier allocations such as adaptive modulation and coding (AMC) in 802.16e or continuous recourse units (CRU) in 802.16m.

Matrix Selection Metrics

We use the given codebook in the standard and try to find an effective way to choose a precoding matrix from the codebook. Since this task is done by the subscriber, the algorithm for matrix selection should be simple and should require as few computations as possible yet still present good performance. One way to select a precoding matrix from a given codebook is to perform an exhaustive search over all matrices in the codebook using some metric or other selection criterion. The following discussion contains a description of certain metrics according to embodiments of the invention.

One such metric, referred to herein as the Abs-Det Metric, is an approximation for the capacity in high signal-to-noise ratio (SNR) environments. The Abs-Det Metric identifies a precoding matrix F that increases, or even maximizes, a capacity of a particular wireless channel.

Let the capacity metric I(F) for precoding matrix F be expressed as $$I(F) = \det\left(I_{N_{streams}} + \frac{E_s}{N_{streams}N_0} F * H * HF\right), \quad (3)$$

where $I_{N_{streams}}$ is the identity matrix of size $N_{streams} \times N_{streams}$, $E_s$ is the total transmit energy, $N_0$ is the noise energy, and F and H are as defined above. Note that (3) may be approximated by neglecting the identity matrix so that $$I(F) \approx \tilde{I}(F) = \left(\frac{E_s}{N_{streams}N_0}\right)^2 \det(F * H * HF), \quad (4)$$

where Ĩ(F) is the Abs-Det Metric. The Abs-Det Metric may also be expressed as $$\tilde{I}(F) = \left(\frac{E_s}{N_{streams}N_0}\right)^2 \text{abs}^2(\det(HF)). \quad (5)$$

The target precoding matrix F may be identified by solving $$F = \arg\max_{F_i \in F} \tilde{I}(F) \quad (6)$$

The Abs-Det Metric enables a reduction in computations of 25% relative to the capacity metric, and its performance is similar to that of the capacity metric (negligible loss) with maximum likelihood decoder in various scenarios (such as different antenna settings, different constellations and code rates, different numbers of streams, and the like).

Turning now to the figures, FIG. 1 is a flowchart illustrating a method 100 of identifying a precoding matrix corresponding to a wireless network channel according to an embodiment of the invention. The precoding matrix is chosen from among a finite set of precoding matrices—called codewords—located in a codebook. The codebook is typically stored in memory at both the base station and the subscriber station of the wireless network. As an example, method 100 may identify a precoding matrix that increases a capacity of a particular wireless channel using the Abs-Det Metric that has just been described. As another example, the steps of method 100 may be performed by a subscriber station of the wireless network.

A step 110 of method 100 is to identify a capacity metric that includes an identity matrix. As an example, the capacity metric can be similar to the metric described in (3). The identity matrix can, in certain embodiments, be multiplied by a constant.

A step 120 of method 100 is to approximate the capacity metric using an approximation metric that ignores the identity matrix. As an example, the approximation metric can be, or can be similar to, the Abs-Det matrix shown in (4) or to the equivalent expression shown in (5).

A step 130 of method 100 is to search over all matrices in a matrix codebook using the approximation metric in order to identify a particular precoding matrix that increases a capacity of the wireless network channel, where the particular precoding matrix has a corresponding matrix index. As an example, this may be accomplished by solving (6). It should be noted that the particular precoding matrix is simply the matrix preferred by the subscriber station. The subscriber station may then communicate this preference to a base station that may, in turn, select the subscriber station's preferred matrix (or another matrix) as the precoding matrix.

A step 140 of method 100 is to transmit the matrix index across the wireless network channel. As an example, step 140 may constitute a report from the subscriber station to a base station regarding the subscriber station's preferred matrix index so that the base station can use that information when it selects a matrix for precoding.

Another such metric, referred to herein as the MMSE Capacity Metric, is an optimized selection criterion based on the actual capacity of the link with MMSE decoder. Let E be a diagonal matrix that includes the energy of the MMSE decoder errors on the diagonal, such that $$E = \text{diag}\left(I_{N_{streams}} - F*H*\left(F*H*HF + \frac{N_{streams}N_0}{E_s}I_{N_{streams}}\right)^{-1}HF\right). \quad (7)$$

Then the MMSE Capacity Metric $I_{MMSE}(F)$ may be expressed as $$I_{MMSE}(F) = \text{trace}(\log(E^{-1})) \quad (8)$$

and the precoding matrix F may be identified by solving $$F = \arg\max_{F_i \in F} I_{MMSE}(F_i) \quad (9)$$

Figure 2:
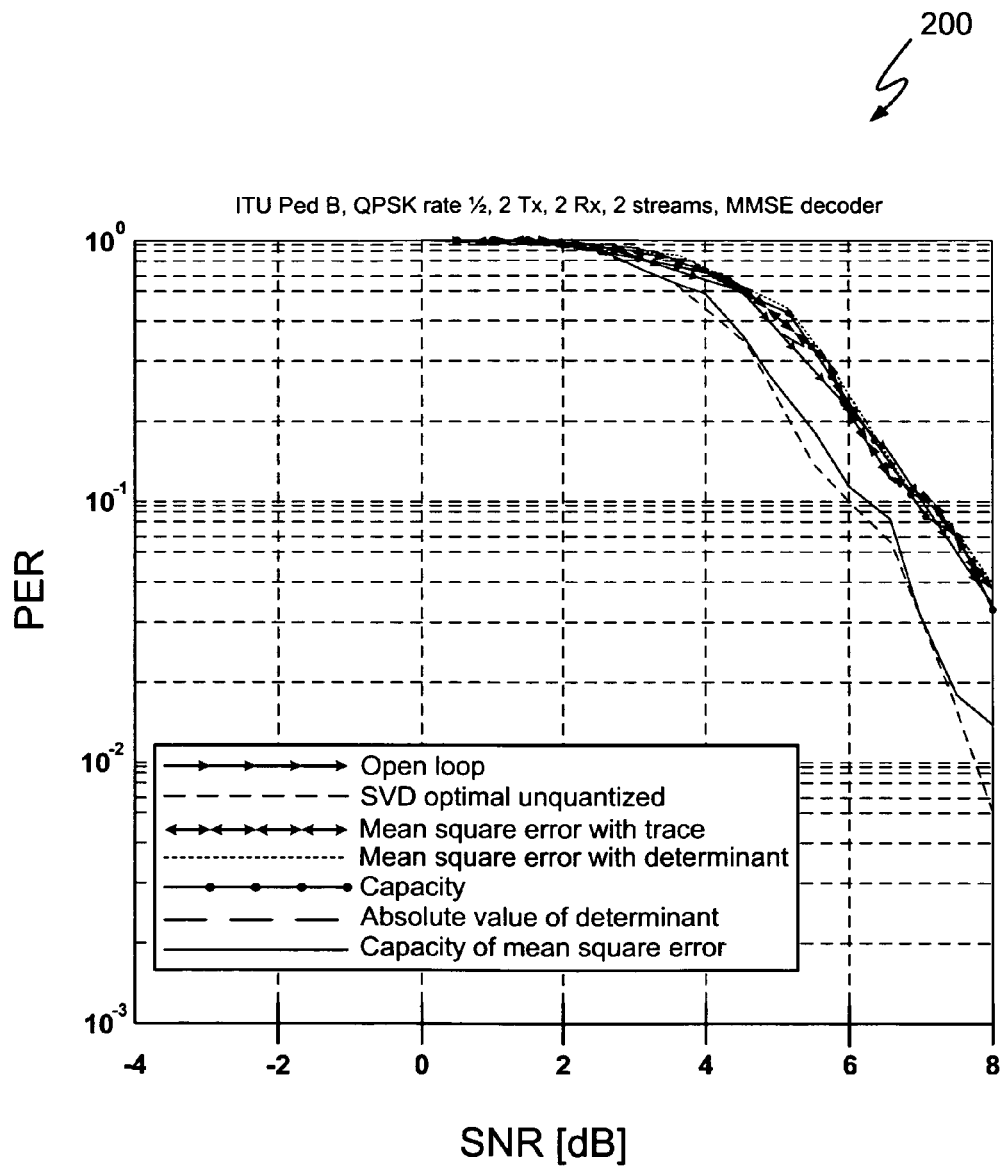
FIG. 2 is a graph showing the performance of achievable using various selection metrics including an MMSE Capacity Metric according to an embodiment of the invention.

For the case with MMSE decoding, two streams, two transmitting antennas, and two receiving antennas, for example, the MMSE Capacity Metric exhibited a performance gain of approximately 0.8 decibels (dB) over open loop (i.e., no beamforming) and showed similar performance to optimal closed loop (i.e., beamforming using the theoretical optimal selection criterion). Various other selection criteria give performance similar to that of open loop. This performance gain is illustrated in FIG. 2, where packet error rates (PER) for various selection criteria are plotted against SNR for the environment described above, i.e., MMSE decoding with two streams, two transmitting antennas, and two receiving antennas. The ITU pedestrian B model and quadrature phase shift keying (QPSK) rate ½ are also assumed. The theoretical optimal metric (which in practice is not implementable) is the lowest line in the graph, while the MMSE capacity metric according to an embodiment of the invention and as described above is the solid line that most closely tracks the optimal metric.

Figure 3:
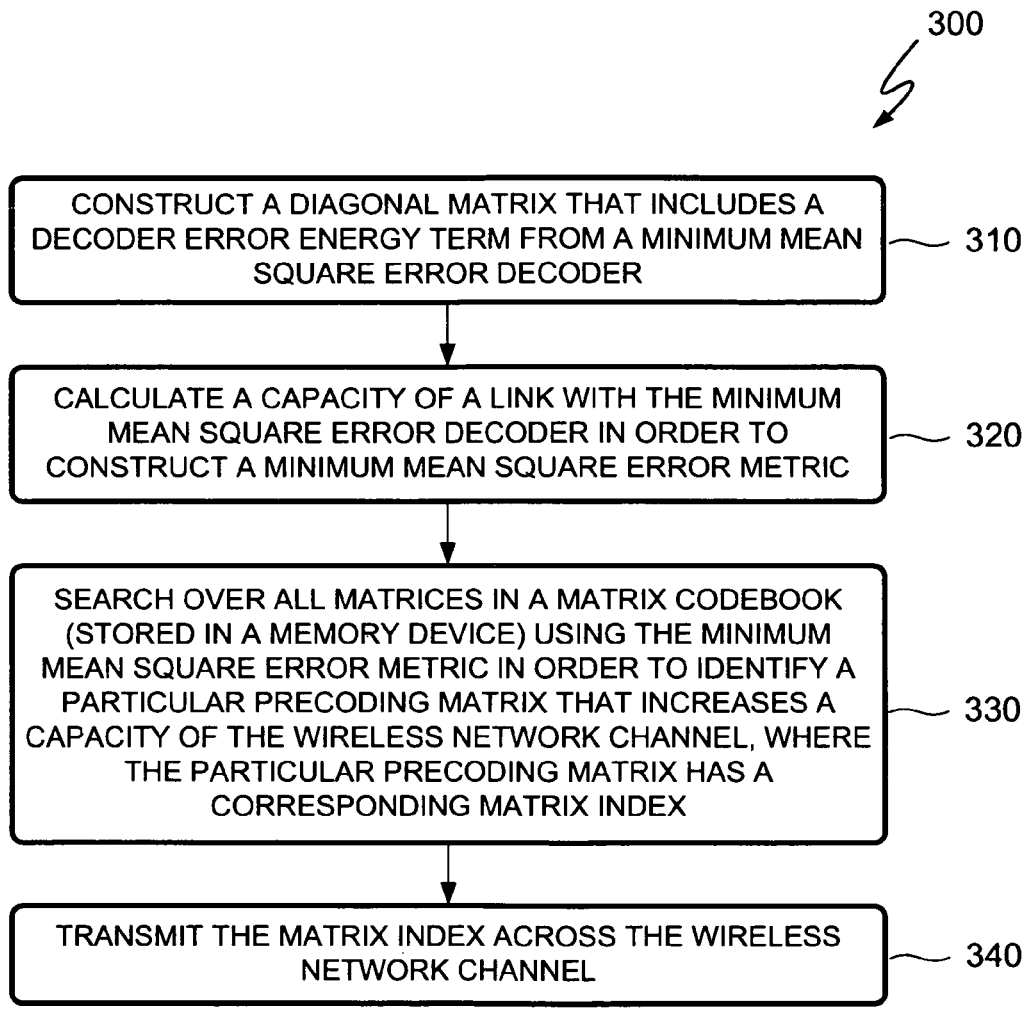
FIG. 3 is a flowchart illustrating a method of identifying a precoding matrix corresponding to a wireless network channel according to another embodiment of the invention.

FIG. 3 is a flowchart illustrating a method 300 of identifying a precoding matrix corresponding to a wireless network channel according to an embodiment of the invention. As an example, method 300 may identify a precoding matrix that increases a capacity of a particular wireless channel using the MMSE Capacity Metric that has just been described. As another example, the steps of method 300 may be performed by a subscriber station of the wireless network.

A step 310 of method 300 is to construct a diagonal matrix that includes a decoder error energy term from a minimum mean square error decoder. As an example, the diagonal matrix can be similar to diagonal matrix E shown in (7).

A step 320 of method 300 is to calculate a capacity of a link with the minimum mean square error decoder in order to construct a minimum mean square error metric. As an example, the minimum mean square error metric can be similar to the metric shown in (8).

A step 330 of method 300 is to search over all matrices in a matrix codebook (stored in a memory device) using the minimum mean square error metric in order to identify a particular precoding matrix that increases a capacity of the wireless network channel, where the particular precoding matrix has a corresponding matrix index. As an example, this may be accomplished by solving (9).

A step 340 of method 300 is to transmit the matrix index across the wireless network channel. As an example, step 340 may constitute a report from the subscriber station to a base station regarding the subscriber station's preferred matrix index so that the base station can use that information when it selects a matrix for precoding. It should be noted that, as the name implies, the preferred matrix index is the index of the matrix preferred by the subscriber station. After the subscriber station communicates this preference to a base station, the base station may, in turn, select the subscriber station's preferred matrix (or another matrix) as the precoding matrix.

Frequency Decimation

According to the IEEE 802.16e and 802.16m standards, only one precoding matrix index is fed back per band (called a logical band in 802.16e and a sub-band in 802.16m and which equals, for example, 72 continuous sub-carriers). Thus, the subscriber (receiver) is required to select one precoding matrix that best suits the entire band. There exist certain methods for selecting a precoding matrix per band, one of which is to calculate the average or sum capacity metric over the band. (In a similar way, other metrics (not necessarily the capacity) can be averaged over the band.) However, the calculation of the metric over all subcarriers and all matrices is a large computational burden. One way to reduce this computational burden is to calculate the metric with frequency decimation, every N sub-carriers (with N≦M, where M is the band size). With frequency decimation, an arbitrary channel matrix is taken from one of the sub-carriers in the group of N sub-carriers. As one example, the channel matrix of the middle sub-carrier may be taken.

To summarize this generalized method:
1. For the selection criterion, choose the corresponding metric.
2. For each precoding matrix in the codebook:
   a. Calculate the metric with the corresponding channel matrix, every N sub-carriers (1≦N≦M).
   b. Calculate the sum/average of the metrics over the band.
3. Then select the precoding matrix that maximizes the sum-metric.

An approximated solution to sum-capacity which is preferred over frequency decimation is to use the capacity metric with average channel matrix over the band. This is exactly the first order approximation of the sum-capacity assuming small channel variations over the band. In the same way, other selection criteria can be used with average channel matrix. In summary:
1. For the selection criterion, choose the corresponding metric.
2. Average the channel matrix of every N sub-carriers (N≦M)
3. For each precoding matrix in the codebook:
   a. Calculate the metric with the corresponding averaged channel matrix, every N sub-carriers (1<N≦M).
   b. Calculate the sum/average of the metrics over the band.
4. Then select the precoding matrix that maximizes the sum-metric.

Figure 4:
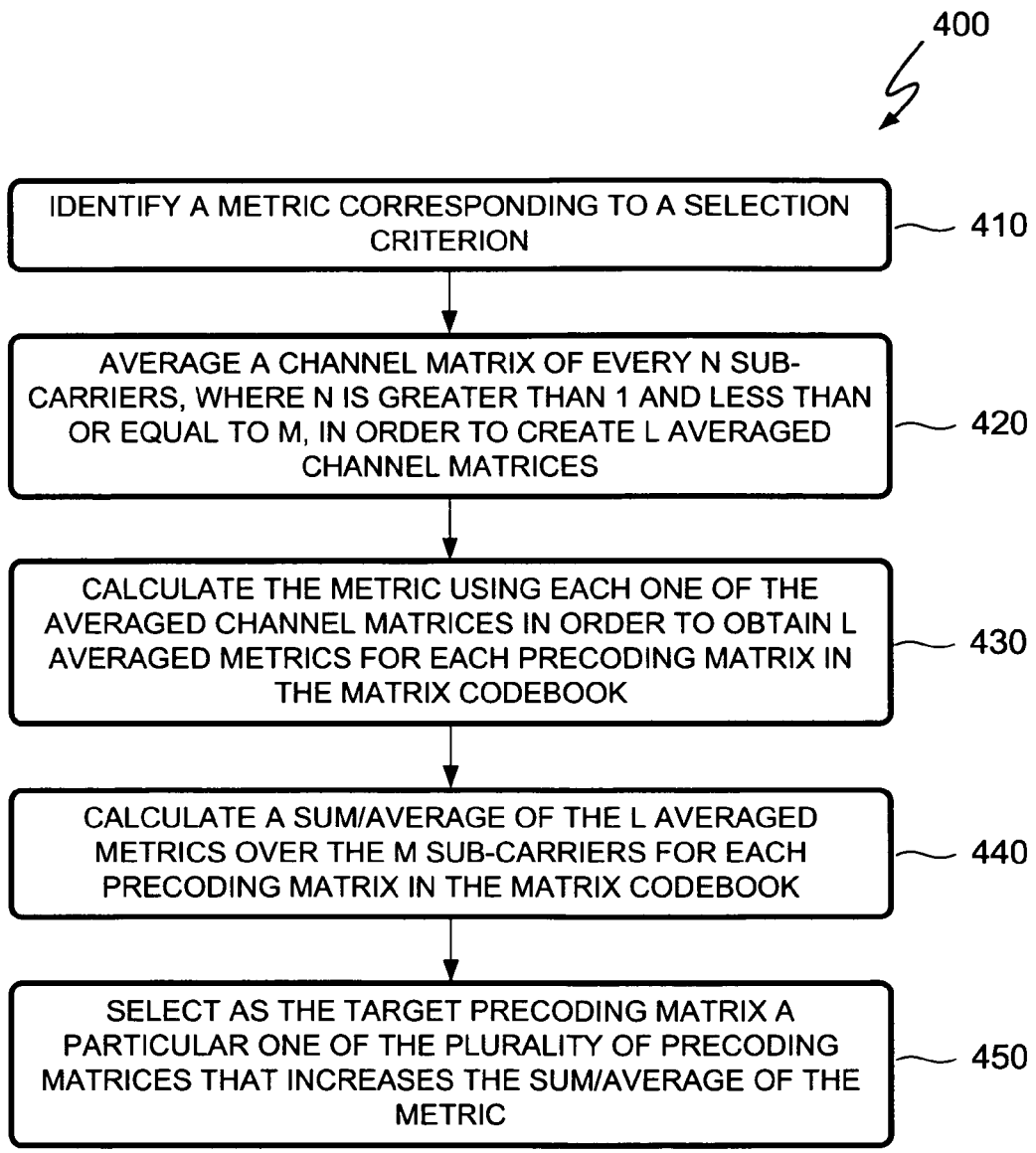
FIGS. 4 and 5 are flowcharts depicting a method of identifying a target precoding matrix for M sub-carriers from a matrix codebook stored in a memory device and containing a plurality of precoding matrices according to an embodiment of the invention.

The average channel method is illustrated in FIG. 4, which is a flowchart depicting a method 400 of selecting a target precoding matrix for M sub-carriers from a matrix codebook stored in a memory device and containing a plurality of precoding matrices according to an embodiment of the invention.

A step 410 of method 400 is to identify a metric corresponding to a selection criterion. A step 420 of method 400 is to average a channel matrix of every N sub-carriers, where N is greater than 1 and less than or equal to M, in order to create L averaged channel matrices. A step 430 of method 400 is to calculate the metric using each one of the averaged channel matrices in order to obtain L averaged metrics for each precoding matrix in the matrix codebook. A step 440 of method 400 is to calculate a sum/average of the L averaged metrics over the M sub-carriers for each precoding matrix in the matrix codebook. A step 450 of method 400 is to select as the target precoding matrix a particular one of the plurality of precoding matrices that increases the sum/average of the metric.

It should be noted that the target precoding matrix is simply the matrix preferred by the subscriber station. The subscriber station may then communicate this preference to a base station that may, in turn, select the subscriber station's preferred matrix (or another matrix) as the precoding matrix.

In one embodiment, N is equal to M. (This means L=1.) In the same or another embodiment, L is equal to M divided by N, i.e., each averaged metric contains the same number of contiguous sub-carriers as do all of the other averaged metrics.

Figure 5:
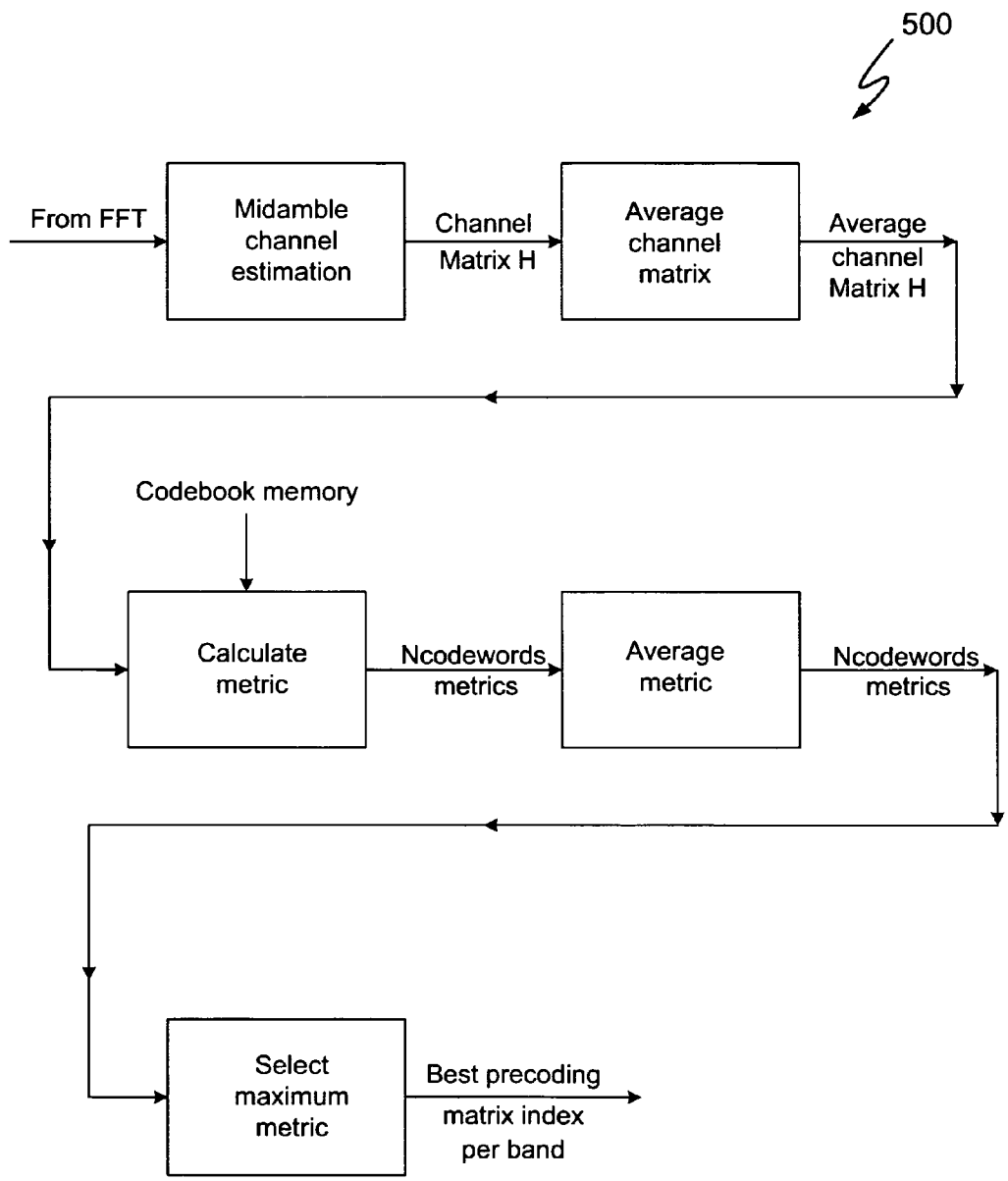

The average channel method achieves performance similar to the sum-capacity method but with far fewer computations. Recall from above that M=band size. Simulation results show that the average channel method with N=M (one averaged channel matrix over the band) gives about the same performance as average capacity with N=1 (without frequency decimation), up to 0.05 dB. This is a saving of about factor N in computations, without considering the channel matrix averaging complexity, which is done only once (rather than for each precoding matrix in the codebook). For comparison, frequency decimation with N=M (selecting one arbitrary channel matrix per band), with the same complexity as average channel with N=M, gives worse performance by about 0.5 dB. Another advantage of averaging the channel matrix is that it helps average the channel estimation errors. FIG. 5 illustrates the average channel method in the form of a block diagram flowchart 500.

Rank Adaptation and Band Selection

There are multiple methods that can be used for the purpose of selecting the transmission band and the rank (i.e., the number of streams) of the precoding matrix. A straight-forward method (for a given codebook) is to compare the metric that was used for precoding matrix selection (the capacity metric, for example) across all bands and ranks. A disadvantage of this method is that all matrices in the codebook have to be scanned for all relevant ranks and the metric has to be found for the best matrix, and thus the complexity is high. A sub-optimal method, but one that eliminates the need to scan all matrices in the codebook, is to approximate the capacity with the best precoding matrix from the codebook using the capacity with optimal precoding matrix without the quantization of the codebook. (This method is referred to as sub-optimal because it first selects the rank based on one criterion and then selects the matrix instead of selecting both rank and matrix together.) Other metrics could also be used for the approximation to arrive at the best matrix in the codebook. A solution for precoding without a codebook is based on singular value decomposition (SVD) of the channel matrix. Thus, the criterion for rank adaptation is the comparison between the capacity with different numbers of streams, assuming SVD precoding.

For example, for two receive antennas and two transmitted streams the capacity is $$C_2 = \log_2 \left| I + \frac{E_s}{2N_0} F * H * HF \right|, \quad (10)$$

where I is the identity matrix, $E_s$ is the total transmit energy, $N_0$ is the noise energy, H is the channel matrix and F is the optimal precoding matrix (without codebook quantization)

with the number of columns corresponding to the number of streams. The capacity for two streams may also be written as $$C_2 = \log_2 \left| I + \frac{E_s}{2N_0} D \right|, \quad (11)$$

where D is a diagonal matrix with the eigenvalues of HH* on the diagonal. The two-stream capacity may alternatively be written as $$C_2 = \log_2 \left(1 + \frac{E_s}{2N_0} \lambda_{max}\right) + \log_2 \left(1 + \frac{E_s}{2N_0} \lambda_{min}\right), \quad (12)$$

where $\lambda_{max}$ is the largest eigenvalue of HH* and $\lambda_{min}$ is the second eigenvalue.

As another example, for one transmitted stream (and any number of transmit and receive antennas) the capacity is $$C_1 = \log_2 \left| I + \frac{E_s}{N_0} F * H * HF \right|, \quad (13)$$

with I, $E_s$, $N_0$, F, and H as defined above. Formulas (10) and (13) are essentially the same; the difference is in the size of the matrix F, which has a size equivalent to the number of transmit antennas by the number of transmitted streams (1 or 2). The capacity for one stream may equivalently be written as $$C_1 = \log_2 \left(1 + \frac{E_s}{N_0} \lambda_{max}\right), \quad (14)$$

with $\lambda_{max}$ as defined above.

Since the capacity (or any other metric) does not represent the performance of precoding with different ranks with the same reliability, we can use a scaling factor when comparing the metrics for different ranks. For example, if we want to compare rank 1 precoding and rank 2 precoding for two receive antennas, we will choose rank 2 when $C_2 > \alpha \cdot C_1$ and choose rank 1 when $C_2 < \alpha \cdot C_1$, where $C_1$ and $C_2$ are as defined above and $\alpha$ is a parameter that can, as an example, be dependent on SNR.

Calculation of Precoding Matrix for Multiple Channel Instances

The calculation requirement for multiple channel instances occurs, for example, when calculating one precoding matrix suitable for multiple bands ("multiple band precoding matrix index"), when calculating a wide-band precoding matrix suitable for any sub-channel, when calculating a long-term precoding matrix suitable for a long time average, or the like. An algorithm according to an embodiment of the invention is to choose the matrix which has an increased (e.g., a maximum) accumulated metric over the instances, as follows:
1. Use a buffer of Ncodewords metrics (according to codebook size)
2. For each precoding matrix in the codebook:
    a. For each channel instance (e.g., band), calculate the metric of the precoding matrix (as done for a single-band precoding matrix)
    b. Accumulate the metrics of each precoding matrix to the metric in the buffer (i.e. add the metric of code-
word i to entry i). In a multiple-band precoding matrix the addition is done over bands (e.g., different frequency bands in the same time frame; in a long-term precoding matrix the addition is done over frames, e.g., different time frames.
3. Choose the precoding matrix according to a desired ("best") accumulated metric.

Figure 6:
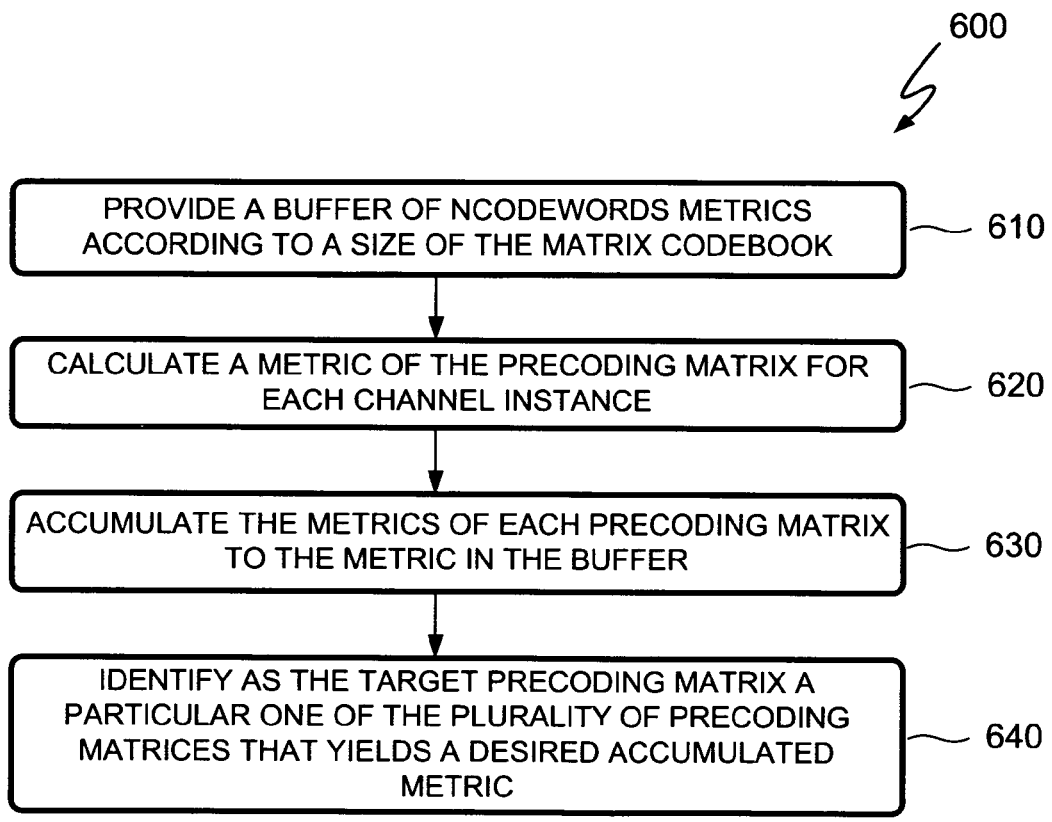
FIGS. 6 and 7 are flowcharts depicting a method of identifying, for multiple channel instances, a target precoding matrix from a matrix codebook stored in a memory device and containing a plurality of precoding matrices according to an embodiment of the invention.
Figure 7:
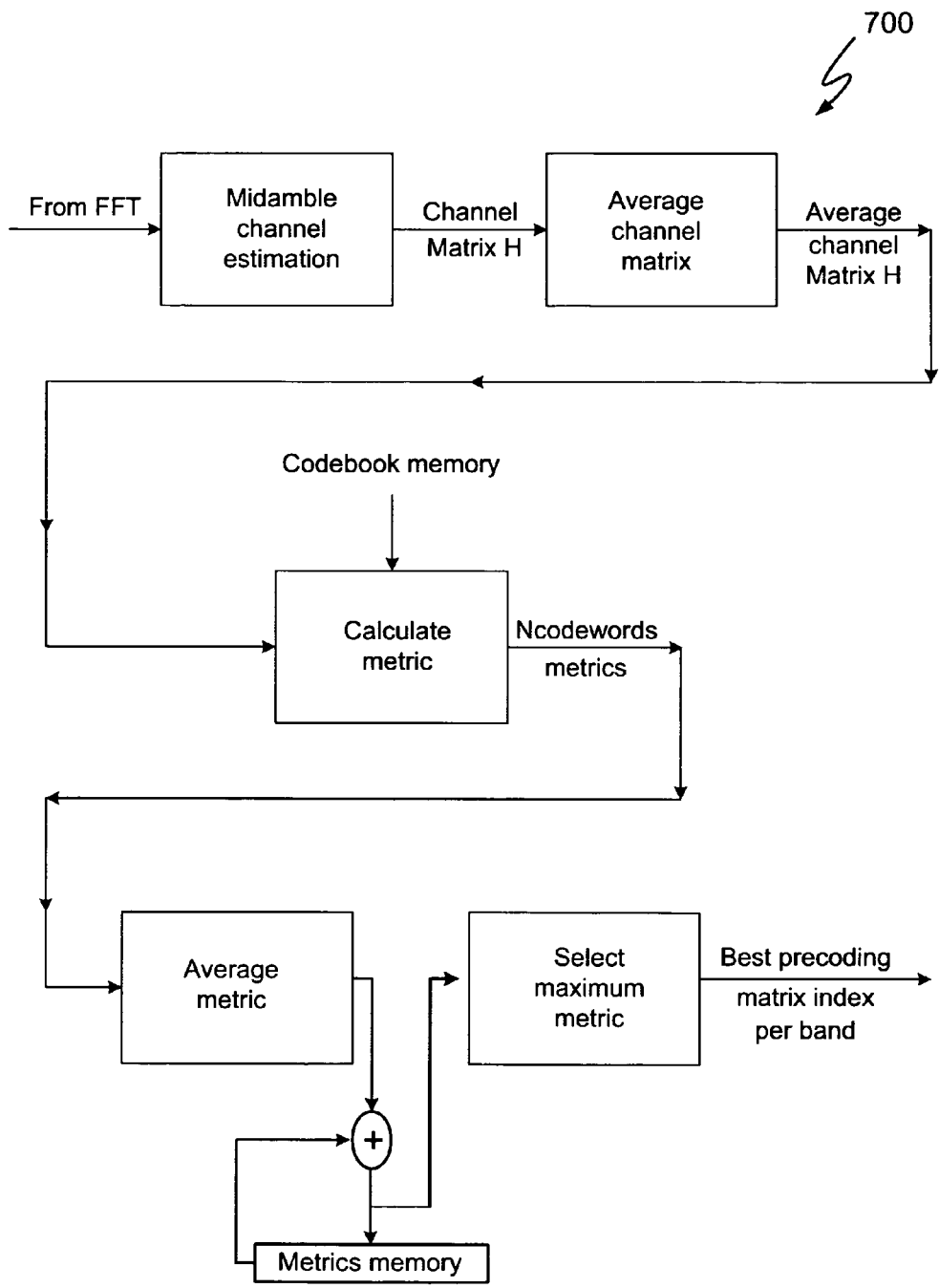

The multiple average channel method is illustrated in FIGS. 6 and 7. FIG. 6 is a flowchart depicting a method 600 of identifying, for multiple channel instances, a target precoding matrix from a matrix codebook stored in a memory device and containing a plurality of precoding matrices according to an embodiment of the invention. FIG. 7 is a block diagram flowchart 700.

A step 610 of method 600 is to provide a buffer of Ncodewords metrics according to a size of the matrix codebook. A step 620 of method 600 is to calculate a metric of the precoding matrix for each channel instance. A step 630 of method 600 is to accumulate the metrics of each precoding matrix to the metric in the buffer. Steps 620 and 630 are performed for each precoding matrix in the matrix codebook. A step 640 of method 600 is to identify as the target precoding matrix a particular one of the plurality of precoding matrices that yields a desired (e.g., a maximal) accumulated metric.

It should be noted that, as was true for the average channel method described above, the target precoding matrix here is simply the matrix preferred by the subscriber station. The subscriber station may then communicate this preference to a base station that may, in turn, select the subscriber station's preferred matrix (or another matrix) as the precoding matrix.

In one embodiment, step 630 comprises performing an addition over a plurality of bands, e.g., different frequency bands (groups of adjacent subcarriers) in the same time frame. In another embodiment, step 630 comprises performing an addition over a plurality of frames, e.g., different time frames.

Calculation of MIMO CINR

It was mentioned above that capacity values may be used for CINR reporting because in 802.16e the CINR for MIMO is based on MIMO capacity. In fact, the WiMAX standard requires, or will require in the future, that a MIMO-capable mobile station with maximum likelihood (ML) receiver implementation shall support averaged CINR reports based on capacity. For example, the mobile station shall report AVG_CINR$_{dB}$ according to the following calculations:

$$\text{AVG\_CINR}_{dB} = 10 \log_{10}(e^{C(d,y|H)} - 1) \quad (15)$$

where C(d, y|H) is the capacity, defined as:

$$C(d, y|H) = \frac{1}{P} \sum_{p=1}^{P} \log\left(1 + \frac{\text{trace}(H_p^H H_p)}{\sigma^2} + \frac{\text{abs}^2(\det(H_p))}{\sigma^4}\right), \quad (16)$$

where the summation is over a set of pilots P located inside a pre-defined region in the Time-Frequency two dimensional plane (of orthogonal frequency-division multiplexing (OFDM) sub-carriers×OFDM symbols), $\sigma^2$ is an estimate of the noise power (defined below), H is the channel response matrix (referred to earlier herein simply as the channel matrix), and $H^H$ is the channel response matrix after having been operated on by a Hermitian transpose operator. An extension of this method is to calculate $C_{region}$(d, y|H) for one or several pre-defined regions and then average $C_{region}(d, y|H)$ over all such pre-defined regions in order to get $C(d, y|H)$.

The WiMAX standard (specifically, IEEE 802.16 REV2 D8) specifies that the noise power shall be averaged over a region (of OFDM sub-carriers×OFDM symbols) in order to reduce its variance, as follows:

$$\sigma^2 = \frac{1}{P}\sum_{p=1}^{P} \sigma_p^2. \quad (17)$$

These requirements of the standard dictate that the AVG_CINR$_{dB}$ calculation must be done in two iterations, the first of which yields the average noise power and the second of which yields the capacity, which in turn requires that all of the frame's (or region's) pilots be kept in memory. In other words, in a first iteration $\sigma^2$ must be calculated over a region (of OFDM sub-carriers×OFDM symbols) and in a second (subsequent) iteration the capacity must be calculated over the same region or block. The need to keep in memory all received pilots during the frame consumes a relatively large amount of memory (e.g., 3600 pilots×32 bits=14.4 kilobytes). Embodiments of the invention significantly reduce the amount of memory required, thus enhancing network performance.

As an alternative to the double-iteration direct calculation of C(d, y|H) as set forth above, embodiments of the invention calculate the capacity using only a single iteration, thus eliminating the need to keep all of the pilots in memory. This simplified calculation is possible because trace($H_p^H H_p$) and abs(det($H_p$)) are nearly constant over a small region (e.g., a region of a single cluster (or 14 subcarriers) over several OFDM symbols (e.g., all symbols in a frame)), meaning that it is possible to find an average value of both trace(·) and abs(det(·)) over the entire region. Thus, although the trace and determinant (and noise power) terms are changing in time and in frequency, in certain environments (such as low mobility environments) it is possible to find a local time/frequency region in which the variations of these terms are small enough that an average value of each term in that region may be found.

Thus, the capacity may be approximated as follows:

$$C(d, y|H) \approx \log\left(1 + \frac{\frac{1}{P}\sum_{p=1}^{P}\text{trace}(H_p^H H_p)}{\sigma^2} + \frac{\left(\frac{1}{P}\sum_{p=1}^{P}\text{abs}(\det(H_p))\right)^2}{\sigma^4}\right). \quad (18)$$

Using (18) allows the averaging of the trace, determinant, and noise power terms to be done using a single iteration. For example, a mobile station may receive a pilot, estimate its channel, calculate the associated "trace," "det," and noise power terms, and then discard the pilot without the need to keep it in memory. Instead, only accumulated (or average) "trace," "det," and "noise power" need to be stored in memory, and these three terms are used to calculate the capacity.

Figure 8:
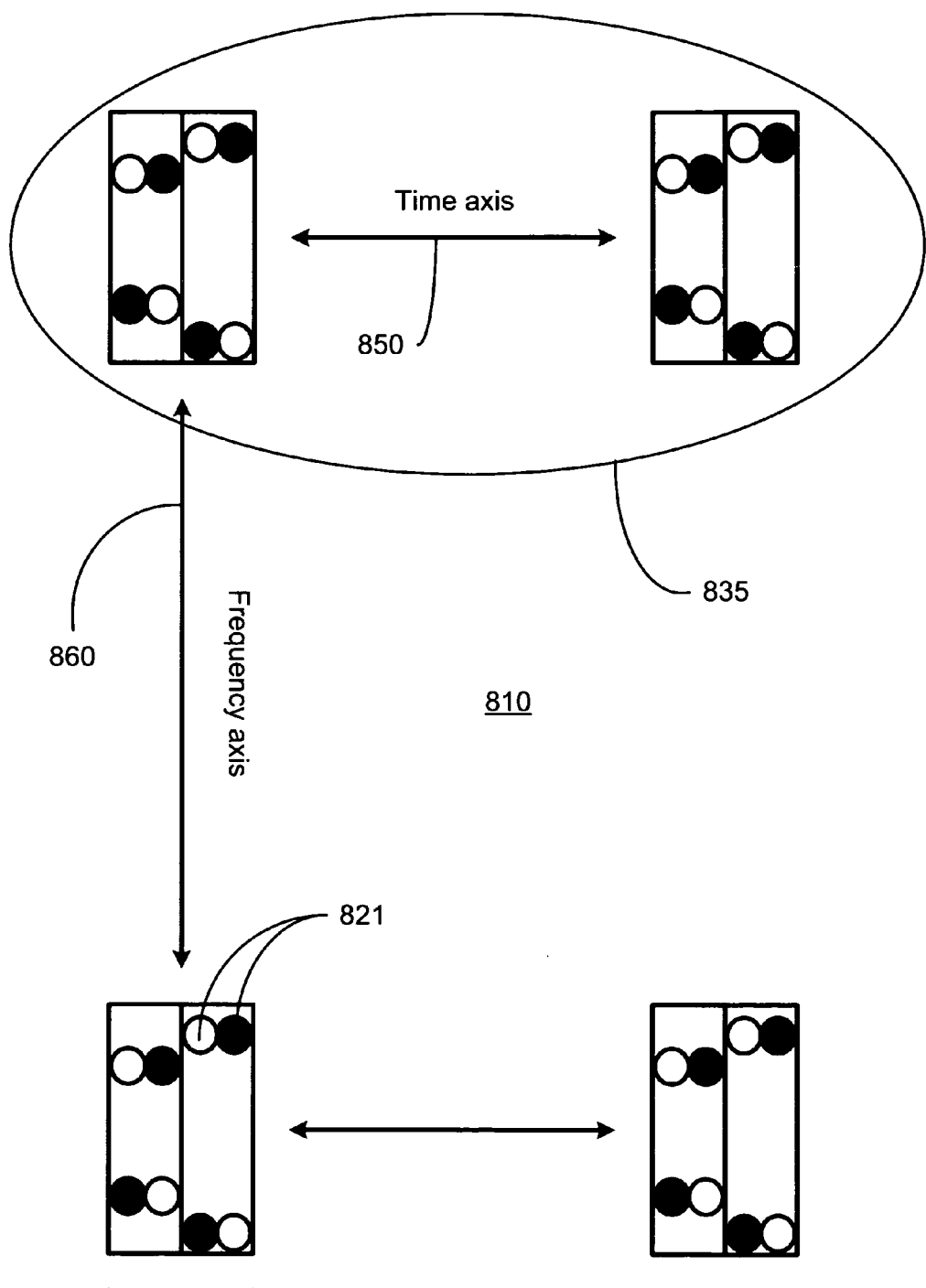
FIG. 8 is a depiction a frame containing a region in which an embodiment of the invention may be implemented.

FIG. 8 illustrates the location of clusters 820 within a frame 810. Frame 810 is further partitioned into regions such as a region 835 in which the approximation of (18) may be implemented. Each cluster 820 is made up of eight pilots 821, half of which (those depicted as white circles) are transmitted from a first transmit antenna and half of which (those depicted as black circles) are transmitted from a second transmit antenna. (This pilot structure is defined by the 802.16e standard and helps the receiver to estimate the channel matrix H.) Also illustrated are a time axis 850 and a frequency axis 860.

Region 835 is an example of a region of a single cluster (or 14 subcarriers) over several OFDM symbols (e.g. all symbols in frame 810). For example, in FIG. 8 the black and white circles represent pilots-subcarriers (as mentioned previously) and every rectangle is a region of 14 tones (in the frequency axis) over 2 symbols (in the time axis). The rectangle is also called a cluster (i.e., cluster 820), which includes 14×4 subcarriers among which are 8 pilot subcarriers. The pre-defined region in which (16), (17), and (18) are calculated is an area of N×M clusters, where the maximum value of M depends on the frame length (in symbols) and the maximum value of N depends on the fast Fourier transform (FFT) bandwidth.

Figure 9:
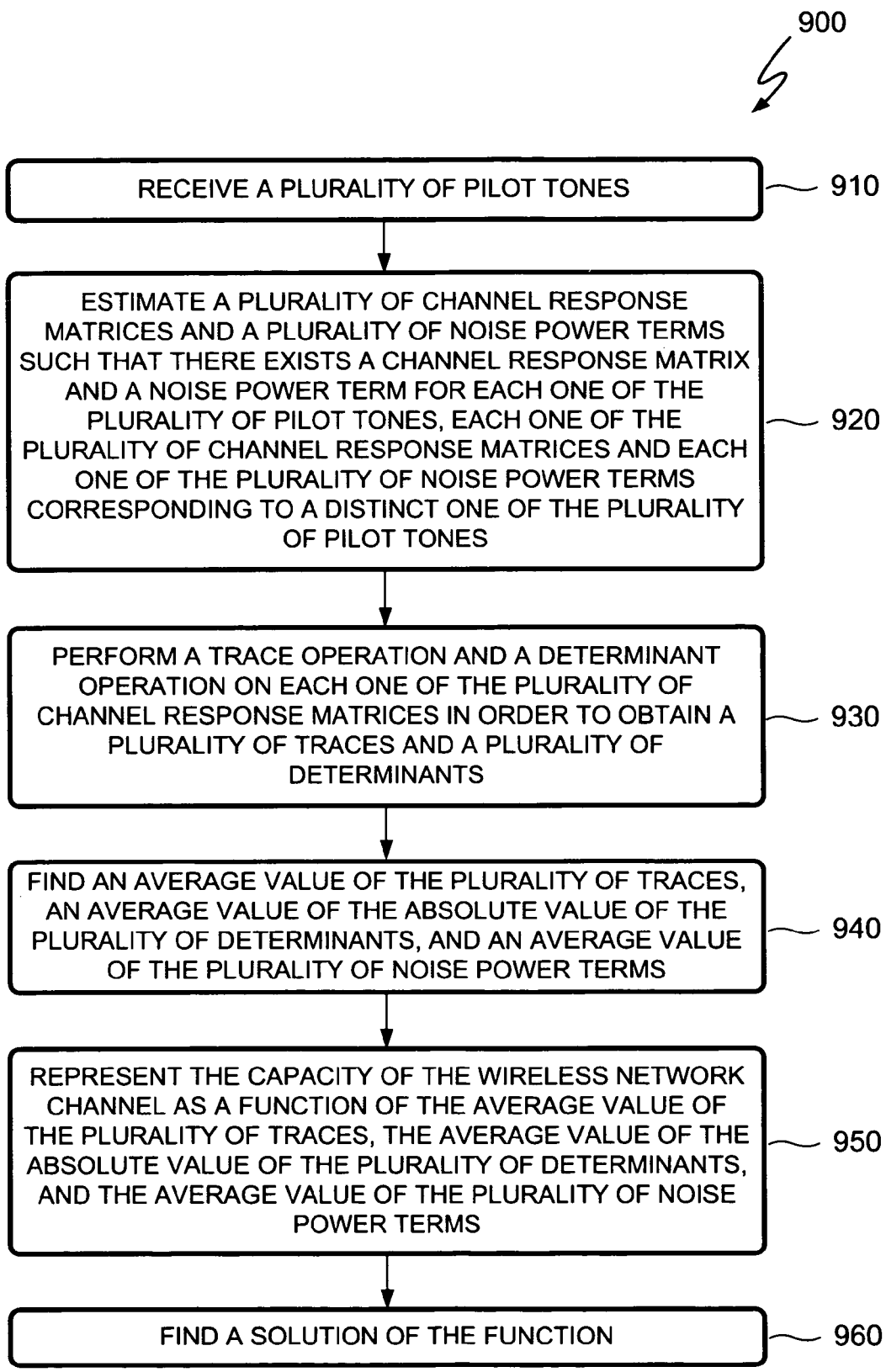
FIG. 9 is a flowchart illustrating a method of approximating a capacity of a wireless network channel in a wireless network according to an embodiment of the invention.

FIG. 9 is a flowchart illustrating a method 900 of approximating a capacity of a wireless network channel in a wireless network according to an embodiment of the invention.

A step 910 of method 900 is to receive a plurality of pilot tones.

A step 920 of method 900 is to estimate a plurality of channel response matrices and a plurality of noise power terms such that there exists a channel response matrix and a noise power term for each one of the plurality of pilot tones, each one of the plurality of channel response matrices and each one of the plurality of noise power terms corresponding to a distinct one of the plurality of pilot tones. In one embodiment, (referring still to FIG. 8) we assume that the channel matrix is constant over pairs of symbols, so using pairs of pilots 823 (black and white, from each transmit antenna) we estimate a single matrix H. However, in the end we have H for each pilot, although H for pilots 823 represented by white circles is equal to H for the pilots 823 represented by black circles. Also, as we assume H is constant over pairs of symbols, certain embodiments calculate trace(·) and det(·) every second symbol. This, however, is merely an implementation to reduce complexity, and other embodiments may calculate trace(·) and det(·) every symbol.

A step 930 of method 900 is to perform a trace operation and a determinant operation on each one of the plurality of channel response matrices (or function thereof—see above) in order to obtain a plurality of traces and a plurality of determinants. In one embodiment, performing the trace operation comprises solving trace ($H_p^H H_p$), where p is an index of the pilot tones, H is the channel response matrix, and $H^H$ is the channel response matrix after having been operated on by a Hermitian transpose operator. In the same or another embodiment, performing the determinant operation comprises solving det($H_p$), where, once again, p is the index of the pilot tones and H is the channel response matrix.

A step 940 of method 900 is to find an average value of the plurality of traces, an average value of the absolute value of the plurality of determinants, and an average value of the plurality of noise power terms. In one embodiment, finding an average value of the plurality of traces comprises solving $$\frac{1}{P}\sum_{p=1}^{P}\text{trace}(H_p^H H_p),$$

where P represents a total number of the pilot tones on which trace(·) was calculated (e.g., every other (e.g., every even or every odd) symbol). In the same or another embodiment, finding an average value of the absolute value of the plurality of determinants comprises solving $$\left(\frac{1}{P}\sum_{p=1}^{P}\text{abs}(\det(H_p))\right)^2,$$

where P again represents a total number of the pilot tones on which det(·) was calculated (e.g. every other (e.g., every even or every odd) symbol). In the same or another embodiment, finding an average value of the plurality of noise power terms comprises solving $$\frac{1}{P}\sum_{p=1}^{P}\sigma_p^2,$$

where p, as before, is an index of the pilot tones, σ is the noise power term, and P represents a total number of the pilot tones in the selected region.

A step 950 of method 900 is to represent the capacity of the wireless network channel as a function of the average value of the plurality of traces, the average value of the absolute value of the plurality of determinants, and the average value of the plurality of noise power terms.

A step 960 of method 900 is to find a solution of the function.

In one embodiment, method 900 comprises receiving a first one of the plurality of pilot tones and then estimating a first channel response matrix, a first noise power term, a first trace, and a first determinant, all corresponding to the first one of the plurality of pilot tones, prior to receiving a second one of the plurality of pilot tones (at which point the estimations are repeated for the parameters that correspond to the second one of the plurality of pilot tones). In some manifestations of this embodiment, method 900 further comprises discarding from a memory device the first one of the plurality of pilot tones after estimating the first channel response matrix, the first noise power term, the first trace, and the first determinant without the need to store it until all other pilots are received or processed.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that the methods and related structures discussed herein may be implemented in a variety of embodiments, and that the foregoing discussion of certain of these embodiments does not necessarily represent a complete description of all possible embodiments.

Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method of approximating a capacity of a wireless network channel in a wireless network, the method comprising:
receiving at a subscriber station of a wireless network a plurality of pilot tones;
estimating at the subscriber station a plurality of channel response matrices and a plurality of noise power terms such that there exists a channel response matrix and a noise power term for each one of the plurality of pilot tones, each one of the plurality of channel response matrices and each one of the plurality of noise power terms corresponding to a distinct one of the plurality of pilot tones;
performing at the subscriber station a trace operation and a determinant operation on each one of the plurality of channel response matrices in order to obtain a plurality of traces and a plurality of determinants;
finding at the subscriber station an average value of the plurality of traces, an average value of the absolute value of the plurality of determinants, and an average value of the plurality of noise power terms;
representing at the subscriber station the capacity of the wireless network channel as a function of the average value of the plurality of traces, the average value of the absolute value of the plurality of determinants, and the average value of the plurality of noise power terms; and
finding at the subscriber station a solution of the function.

2. The method of claim 1 wherein:
performing the trace operation comprises solving trace$(H_p{}^H H_p)$, where p is an index of the pilot tones, H is the channel response matrix, and $H^H$ is the channel response matrix after having been operated on by a Hermitian transpose operator.

3. The method of claim 2 wherein:
finding an average value of the plurality of traces comprises solving $$\frac{1}{P}\sum_{p=1}^{P}\text{trace}(H_p^H H_p),$$

where P represents a total number of the pilot tones on which trace$(H_p{}^H H_p)$ was calculated.

4. The method of claim 1 wherein:
performing the determinant operation comprises solving det$(H_p)$, where p is an index of the pilot tones and H is the channel response matrix.

5. The method of claim 4 wherein:
finding an average value of the absolute value of the plurality of determinants comprises solving $$\left(\frac{1}{P}\sum_{p=1}^{P}\text{abs}(\det(H_p))\right)^2,$$

where P represents a total number of the pilot tones on which det$(H_p)$ was calculated.

6. The method of claim 1 wherein:
finding an average value of the plurality of noise power terms comprises solving $$\frac{1}{P}\sum_{p=1}^{P} \sigma_p^2,$$

where p is an index of the pilot tones, σ is the noise power term, and P represents a total number of the pilot tones.

7. The method of claim 1 comprising:
receiving a first one of the plurality of pilot tones at the subscriber station;
at the subscriber station, estimating a first channel response matrix, a first noise power term, a first trace, and a first determinant, all corresponding to the first one of the plurality of pilot tones, prior to receiving a second one of the plurality of pilot tones at the subscriber station.

8. The method of claim 7 further comprising:
discarding from a memory device associated with the subscriber station the first one of the plurality of pilot tones after estimating the first channel response matrix, the first noise power term, the first trace, and the first determinant.

\* \* \* \* \*